UNITED STATES PATENT OFFICE 2,568,648

METHOD OF POLYMERIZING BUTADIENE-1,3 HYDROCARBONS IN AQUEOUS EMULSION IN THE PRESENCE OF MERCAPTO-SUBSTITUTED MONOCARBOXYLIC ACID ESTERS

John C. McCool, Akron, Ohio, assignor to The B. F. Goodrich Company, New York, N. Y., a corporation of New York No Drawing. Application December 26, 1946, Serial No. 718,600

1 Claim. (Cl. 260—84.3)

This invention relates to the polymerization in aqueous emulsion of butadiene-1,3 hydrocarbons either alone, in admixture with each other, or with other unsaturated compounds copolymerizable therewith, and particularly to new modifiers for such polymerizations. The principal objects of the invention are to provide a method for decreasing the time required to effect such polymerizations, and to effect an improvement in the properties of the polymers obtained, particularly in their softness and plasticity.

I have discovered that these and other objects may be attained by carrying out the polymerization of butadiene-1,3 hydrocarbons in aqueous emulsion in the presence of a polymerization modifier which is a mercapto-substituted aliphatic mono-carboxylic acid ester containing from 12 to 20 carbon atoms. In such an ester, the mercapto substitution may occur in either the acid or alcohol residue and the 12 to 20 carbon atoms present may be divided in any manner between the acid and alcohol residues. For example, the acid residue may be derived from such saturated aliphatic mono-carboxylic acids as acetic, propionic, butyric, valeric, caproic, heptylic, caprylic, pelargonic, capric undecyclic, lauric, myristic, palmitic, stearic, and the like or from such unsaturated aliphatic monocarboxylic acids as crotonic and oleic and the alcohol residue may be derived from such alcohols as ethyl, propyl, butyl, amyl, hexyl, heptyl, octyl, dodecyl, cetyl, allyl and others, provided, of course, that the number of carbon atoms in the acid and alcohol combined is in the range of 12 to 20. The mercapto substitution may be relatively close to the ester linkage as in 2-mercapto ethyl myristate, or it may be remote from the ester linkage as in n-amyl-omega-mercapto undecylate. In addition to the mercapto substitution the ester may contain additional substituents on the carbon chains such as hydroxyl groups, keto group, alkoxy groups, etc. Preferably the ester is saturated in nature and is composed exclusively of carbon, hydrogen, oxygen and sulfur atoms. More preferably, it contains only one sulfur atom, present in the mercapto group, and only 2 to 3 oxygen atoms two of which are present in the ester linkage

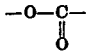

and the other of which, if any, is present in an oxy or oxo group, preferably an hydroxy group.

The compounds in the above-defined class may be divided into two types, namely:

(1) Mercapto-substituted aliphatic monoesters containing from 12 to 20 carbon atoms and in which the mercapto substitution is on the carbon chain of the acid residue. Typical examples of compounds of this type are:

(1) Ethyl omega-mercapto undecylate

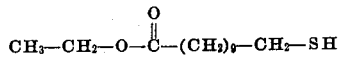

(2) n-Butyl omega-mercapto undecylate

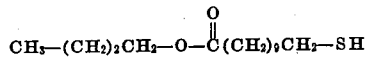

(3) n-Heptyl 10-mercapto undecylate

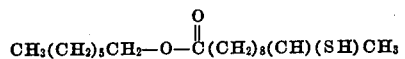

(4) Propyl omega-mercapto dodecylate

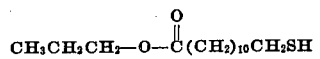

(5) n-Amyl 9-mercapto decanoate

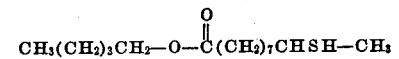

(6) Ethyl alpha-mercapto undecylate

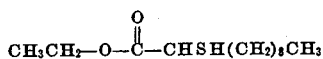

(7) n-Heptyl omega-mercapto undecylate

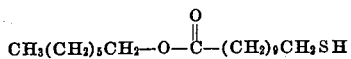

(8) Isoamyl omega-mercapto undecylate

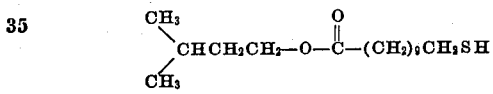

(9) Ethyl alpha-mercapto oleate

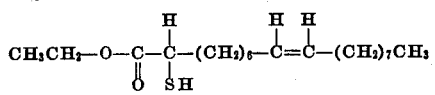

(10) Decyl 2-mercapto propionate

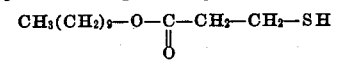

(11) 2-hydroxy ethyl omega-mercapto undecylate

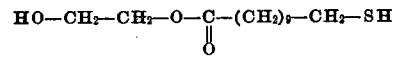

(12) 2-ethoxy ethyl omega-mercapto undecylate

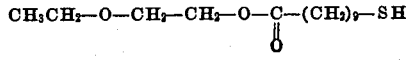

(13) Methyl omega-mercapto undecylate

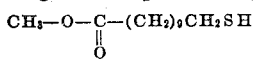

(14) Methyl 10-mercapto stearate

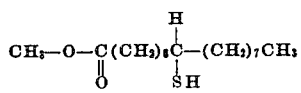

(2) Mercapto-substituted aliphatic monoesters containing from 12 to 20 carbon atoms and in which the mercapto substitution is on the carbon chain of the alcohol residue. Typical compounds of this type are:

(1) 2-mercapto ethyl laurate $$CH_3(CH_2)_{10}-\overset{O}{\underset{\|}{C}}-O-CH_2CH_2SH$$

(2) 3-mercapto propyl laurate $$CH_3(CH_2)_{10}-\overset{O}{\underset{\|}{C}}-O-CH_2-CH_2-CH_2SH$$

(3) 2-mercapto ethyl myristate $$CH_3(CH_2)_{12}\overset{O}{\underset{\|}{C}}-O-CH_2CH_2SH$$

(4) 2-mercapto ethyl oleate

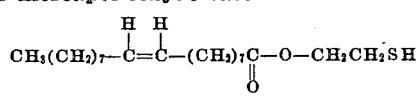

(5) 2-mercapto propyl myristate $$CH_3(CH_2)_{12}-\overset{O}{\underset{\|}{C}}-OCH_2CH(SH)CH_3$$

(6) 2-mercapto ethyl palmitate $$CH_3(CH_2)_{13}CH_2\overset{O}{\underset{\|}{C}}-O-CH_2CH_2SH$$

(7) 2-mercapto ethyl lambda-hydroxy stearate

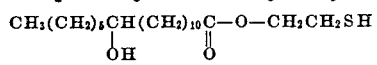

(8) 2-mercapto-ethyl 10-keto-stearate $$CH_3(CH_2)_7\overset{O}{\underset{\|}{C}}(CH_2)_8\overset{O}{\underset{\|}{C}}-O-CH_2CH_2SH$$

(9) 2-mercapto-ethyl alpha-hydroxy palmitate

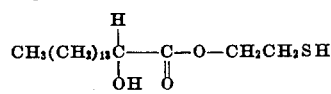

In the practice of this invention one or more butadiene-1,3 hydrocarbons or mixtures thereof with one or more other monomers copolymerizable therewith are polymerized in the form of an aqueous emulsion in the presence of a small amount, preferably from 0.1 to 5% by weight based on the monomeric material, of one or more of the modifying compounds of the character described above, particularly one of the compounds specifically disclosed above. The preferred polymerization method is to emulsify the monomeric material and the modifier of this invention in water by means of an emulsifying agent such as a fatty acid or disproportionated rosin acid soap, and then to agitate the emulsified mixture at temperatures of about 10 to 100° C., preferably at temperatures of the order of 20 to 60° C. for a time sufficient to convert a substantial proportion, say from 50 to 100%, of the monomeric material into the polymeric state. In addition to the organic modifying compounds of this invention, it is also desirable that the polymerization emulsion contain a polymerization initiator such as potassium persulfate, benzoyl peroxide or other per-oxygen compound, and, if desired, other substances affecting the polymerization such as water-soluble heavy metal compounds and other polymerization catalyst and promoters, other polymerization modifiers and the like. The polymerization process results in the formation of latex-like dispersions which may be coagulated in the usual manner to obtain the polymers in the solid form.

The method of this invention may be applied to the polymerization in aqueous emulsion of any of the butadiene-1,3 hydrocarbons, by which is meant butadiene-1,3 and its hydrocarbon homologs which polymerize in essentially the same manner, such as isoprene, 2,3-dimethyl butadiene-1,3, piperylene, and the like. Mixtures of such hydrocarbons with one another or with other monomers which are copolymerizable therewith in aqueous emulsion to form linear copolymers may also be used. Monomers copolymerizable with butadiene-1,3 hydrocarbons are well known as a class to those skilled in the art and include aryl olefins such as styrene, methyl styrene, chloro styrenes, p-methoxy styrene, vinyl naphthalene, and the like; acrylic and substituted acrylic acids and their esters, nitriles and amides such as acrylic acid, methyl acrylate, ethyl acrylate, methyl methacrylate, methyl ethacrylate, ethyl methacrylate, acrylonitrile, methacrylonitrile, methacrylamide and the like; methyl vinyl ketone, methyl isopropenyl ketone, vinylidene chloride, vinyl furane, vinyl pyridines, diethyl fumarate, ethylene and other unsaturated hydrocarbons, esters, ethers, nitriles, etc. which contain a single olefinic double bond, and also other diolefinic materials such as chloroprene. It is preferable in this invention to employ monomeric mixtures in which the butadiene-1,3 hydrocarbons predominate for such mixtures produce synthetic rubbery materials on polymerization. However, the invention is applicable to the polymerization of any mixture of a butadiene-1,3 hydrocarbon with any other monomer copolymerizable therewith in aqueous emulsion.

The following specific Examples 1 and 2 will demonstrate illustrative methods of preparation of the organic modifying materials of this invention and Examples 3 to 6 will illustrate preferred methods of utilizing these materials in the polymerization of butadiene-1,3 hydrocarbons. These examples are illustrative only and are not intended to limit the invention in any respect. The parts are by weight.

*Example 1*

A mixture of 114 grams (0.5 mole) of myristic acid and 78 grams (1.0 mole) of 2-mercaptoethanol in 1,000 ml. of benzene containing 1.2 grams of p-toluene sulfonic acid was refluxed azeotropically under nitrogen until the theoretical quantity of water separated. The reaction mixture was then subjected to distillation to first remove the benzene, and the ester formed was then distilled at reduced pressure through a 10 cm. Vigreaux column. The yield of ester (boiling at 160 to 163° at 0.2 mm. Hg) was approximately 70%. The purity of the 2-mercapto ethyl myristate ester, as determined by analysis of the mercaptan sulfur content, was 95.6%.

A second similar ester was prepared from a 12-hydroxy stearic acid made from hydrogenated castor oil. The hydroxy stearic acid and 2-mercapto ethanol were reacted in much the same manner as above. Purification of the 2-mercapto ethyl lambda-hydroxy stearate was effected by crystallization from 90% alcohol. The purity of the purified ester, as indicated by mercaptan sulfur content, was 94.6%.

In an entirely similar manner, using the appropriate acid and alcohol, the other esters listed in type (2) above are prepared.

Example 2

Undecylenic acid in the amount of 46 grams or 0.25 mole was reacted with thioacetic acid in the amount of 19 grams or 0.25 mole. The reaction product was hydrolyzed in a nitrogen atmosphere by stirring with a 12% sodium hydroxide solution on a steam bath for one hour. After cooling and acidifying the hydrolysis reaction mixture, the crude acid was separated and purified by distillation in vacuo. The distilled omega-mercapto undecylic acid had a melting point of 46 to 47° C. and showed no melting point depression when mixed with a sample of the reaction product prepared by reaction of omega-bromo undecylic acid with sodium hydrosulfide in alcohol.

The iso-amyl ester of the omega-mercapto undecylic acid was prepared by azeotropic esterification in benzene of one mole of the acid and 2 moles of iso-amyl alcohol. The ester was isolated as were the esters in Example 1. The ester had a boiling point of 163 to 166° C. at 0.48 mm. Hg and its purity was 99.5%.

A procedure similar to that of Example 2 was used to prepare the ethyl, n-butyl, iso-butyl, n-amyl, n-hexyl and n-heptyl esters of undecylic acid. Similar procedural methods are also used to prepare the other esters of mercapto-substituted carboxylic acids disclosed in type (1) above.

Example 3

A mixture of 71.5 parts of butadiene-1,3 and 28.5 parts of styrene was emulsified in 180 parts of distilled water containing 5 parts of fatty acid soap as the emulsifying agent, 0.3 part of potassium persulfate as the polymerization initiator, and 0.558 part of 2-mercapto ethyl myristate (as prepared in Example 1) as the polymerization modifier. The emulsion was then agitated at 50° C. for 10.75 hours. The polymerization was terminated by the addition of 2% phenyl-beta-naphthylamine on the weight of polymer formed. The latex or emulsion was coagulated by addition of salt and alcohol and the synthetic rubber which was obtained was dried at 60° C. in a circulating air oven. The yield of synthetic rubber copolymer was approximately 76.5% of the monomers charged. The synthetic rubber obtained had a Mooney viscosity, as determined using the 1.500 inch rotor after 4 minutes at 212° F., of 68. The per cent gel content was only 29 and the intrinsic viscosity was 1.18. The synthetic rubber was easily milled yet upon vulcanization in standard tire tread compositions vulcanizates of from 2500 to 3500 lbs. per sq. in. and ultimate elongations of 500 to 600% were obtained.

Substantially equivalent results were obtained when 2-mercapto-ethyl esters of lauric, stearic, palmitic and oleic acid were used in place of 2-mercapto ethyl myristate.

When the 2-mercapto-ethyl myristate is omitted, however, the above polymerization requires from 50 to 60 hours to produce a yield of 20 to 25%, and the product obtained is a tough, non-plastic material which is extremely difficult to mill and which possesses when vulcanized tensile strengths less than 2,000 lbs. per sq. in. and ultimate elongations less than 300 to 400%.

Example 4

Iso-amyl omega-mercapto undecylate in the amount of 0.569% (on monomers) was substituted for the 2-mercapto ethyl myristate of Example 3. A 77.9% yield of butadiene styrene copolymer was obtained in 10.3 hours at 50° C. The resulting copolymer was very soft for it was possessed of a Mooney viscosity (1.500 inch rotor after 4 minutes at 212° F.) of 37. The polymer had a gel content of only 8% and an intrinsic viscosity of 1.75.

When this example was repeated using ethyl, butyl, hexyl and heptyl esters of omega-mercapto undecylic acid, similar soft plastic copolymers were obtained in 75 to 80% yield in less than 20 hours. This same result was also secured when acrylonitrile was used in place of styrene and when disproportionated rosin soap was used in place of fatty acid soap as the emulsifier.

The above examples illustrate the use of the mercapto ester modifiers of this invention in the polymerization of a mixture of butadiene-1,3 and styrene carried out in the usual manner and under the usual conditions, adding the modifier prior to polymerization and effecting the polymerization in 10 to 20 hours at 50° C. to produce yields of 70 to 80%. As a matter of fact, however, the modifiers of this invention possess properties which enable them to be used quite effectively in polymerizations carried out in other ways and under conditions which are not favorable for modification when previously known modifiers such as 12 to 16 carbon atom alkyl mercaptans are used.

For instance, such alkyl mercaptans require an appreciable time interval after addition to an emulsion containing a butadiene-1,3 hydrocarbon before exerting their modification action (preventing of cross linkage between polymer chains) due to their low rate of solubilization in aqueous soap solutions. The mercapto esters of this invention, however, particularly those containing from 12 to 16 carbon atoms, possess a rapid rate of solubilization in aqueous soap solutions and hence are rapidly transferred from the monomer phase of the emulsion to the soap interface, where they are available for modification, within a short time after addition to the emulsion. Moreover, the rate of solubilization of these esters may be varied by varying the number of carbon atoms in the ester and by using mercapto esters containing an hydroxy substituent (the higher the number of carbon atoms, in the range of 12 to 20, the lower the rate of solubilization, and the rate of solubilization being increased by the presence of an hydroxy group) thereby permitting of control over modification action not possible when using alkyl mercaptans.

The use of the mercapto esters of this invention with high rates of solubilization in soap solutions is of particular importance when the polymerization is effected while adding the modifier in stages throughout the polymerization and when the polymerization is effected using ultra rapid recipes in a period of 2 to 8 hours or less and at low temperatures of the order of 10 to 30° C. In these instances results are secured with the modifiers of this invention which are not possible when using known modifiers such as the alkyl mercaptans. This is illustrated by the following Examples 5 and 6.

Example 5

The polymerization of a mixture of 75 parts of butadiene-1,3 and 25 parts of styrene was effected in an aqueous emulsion containing 180 parts of water, 5 parts of soap and 0.3 part of potassium persulfate by adding 0.1 to 0.2 part of 2-mercapto ethyl laurate together with a part of the styrene at the start of polymerization and then adding an additional 0.2 to 0.3 part of this mercapto ester as a solution in the remainder of the styrene in three stages during the time when 20 to 70% of the monomers were polymerized. The polymerization was terminated when about 85% of the monomers were polymerized. The synthetic rubber obtained was quite soft and plastic, possessing a Mooney viscosity, as determined with the Mooney viscosimeter using a 1.500 inch rotor after 4 minutes at 212° F., of 40 to 50, was gel free and possessed an intrinsic viscosity above 1.5. The synthetic rubber obtained breaks down easily and forms a smooth band on the rolls of a rubber mill, and is especially useful in forming tire carcasses because of its softness and tackiness.

When lauryl mercaptan is used in place of 2-mercapto ethyl laurate, however, the syntheic rubber obtained is not so soft and plastic and contains a considerable portion of insoluble gel. These differences are believed due to the fact that the mercaptan modifier added during the polymerization fails to exert its modifying action as rapidly as needed whereas the mercapto ester modifier with its faster rate of solubilization functions promptly and efficiently in preventing the formation of cross linkages with the result that a thoroughly and uniformly modified, soft, plastic polymer is secured.

Example 6

An emulsion containing 70 parts of butadiene-1,3, 30 parts of styrene, 0.5 part of benzoyl peroxide, 5 parts of potassium oleate, 1.0 part of $Na_4P_2O_7 \cdot 10H_2O$, 0.5 part of ferrous ammonium sulfate hexahydrate, 200 parts of water and 0.83 part of 2-mercapto ethyl-lambda-hydroxy stearate was prepared and was agitated for 125 minutes at 30° C. after which time the polymerization was terminated. Because of the presence of the iron pyrophosphate complex catalyst the polymerization was quite rapid and an 80% yield of polymer was secured. The polymer obtained was considerably softer and more plastic than a polymer obtained at 80% conversion in the same way except that no mercapto ester was present in the emulsion and was also more plastic than a polymer obtained at 80% conversion using the same recipe except that an equivalent amount of lauryl mercaptan was employed as modifier in place of the mercapto ester. Moreover, the time required for polymerization to 80% conversion (125 minutes) was less than when the mercapto ester was used than in the two latter instances, those polymerizations requiring 180 and 159 minutes respectively.

It is evident from this example that the mercapto esters of this invention are particularly valuable modifiers in ultra rapid polymerizations suitable for continuous polymerization processes such as are effected when complex heavy metal catalysts are used. Many other such catalysts are known to the art and may be used in place of the specific catalyst described to obtain yields of copolymer of above 50% in less than 8 hours at temperatures of 5 to 30° C.

While the foregoing examples have illustrated methods of polymerizing butadiene-1,3 hydrocarbons in aqueous emulsion in the presence of mercapto-substituted carboxylic acid esters containing from 12 to 20 carbon atoms as polymerization modifiers, and have also indicated to some degree the extent to which variations and modifications may be made in the nature of the mercapto-substituted ester employed, in the nature and proportions of the materials polymerized and in the nature and proportions of other substances such as emulsifying agents, polymerization initiators, polymerization catalysts, etc., which may be present during the polymerization, it is to be understood that the examples do not limit the invention since numerous other modifications and variations may be made in the method and equivalent chemical materials utilized in accordance with the disclosure and the normal skill of the art without departing from the spirit and scope of the invention as defined in the appended claim.

I claim:

The method which comprises polymerizing in aqueous emulsion a mixture comprising butadiene-1,3 and styrene in the presence of 2-mercapto ethyl lambda-hydroxy stearate.

JOHN C. McCOOL.

REFERENCES CITED

The following references are of record in the file of this patent:

UNITED STATES PATENTS

| Number | Name | Date |
| --- | --- | --- |
| 2,397,201 | Pfau | Mar. 26, 1941 |
| 2,458,432 | Sharkey | Jan. 4, 1949 |
| 2,497,107 | Weber | Feb. 14, 1950 |